United States Patent
Rapp

(10) Patent No.: US 6,732,401 B2
(45) Date of Patent: May 11, 2004

(54) WIPER ARM FOR AUTOMOBILES

(75) Inventor: Harald Rapp, Buehl (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 10/204,371

(22) PCT Filed: Jun. 9, 2001

(86) PCT No.: PCT/DE01/02160

§ 371 (c)(1),
(2), (4) Date: Aug. 20, 2002

(87) PCT Pub. No.: WO02/00479

PCT Pub. Date: Jan. 3, 2002

(65) Prior Publication Data

US 2003/0019067 A1 Jan. 30, 2003

(30) Foreign Application Priority Data

Jun. 27, 2000 (DE) .......................... 100 31 274

(51) Int. Cl.⁷ ................ B60S 1/32; B60S 1/34
(52) U.S. Cl. ................ 15/250.351; 15/250.32
(58) Field of Search .......... 15/250.351, 250.32, 15/250.33, 250.01

(56) References Cited

U.S. PATENT DOCUMENTS 3,042,955 A * 7/1962 Oishei ................ 15/250.351
4,180,885 A * 1/1980 Thornton et al. ........ 15/250.32
4,347,641 A   9/1982 Kohler ................ 15/250.351
4,587,685 A   5/1986 Verton ................ 15/250.351
5,291,627 A * 3/1994 Liou ................ 15/250.04
6,473,932 B1 * 11/2002 Igarashi ................ 15/250.351

FOREIGN PATENT DOCUMENTS

DE    23 19 062 A   10/1974
DE    35 17 574 A   11/1986
DE    197 35 301 A   2/1999
GB    2036546   *   7/1980   .............. 15/250.32

* cited by examiner

Primary Examiner—Gary K. Graham
(74) Attorney, Agent, or Firm—Michael J. Striker

(57) ABSTRACT

A wiper arm for motor vehicles having a driveable mounting arm (4) for connection to a motor vehicle, and a wiper bar (6) hinge-mounted on the mounting arm (4), which said wiper bar has a connecting hook (8) for attaching a wiper blade, whereby the connecting hook (8) has a first hook leg (19) having a thickness $D_A$, and a second hook leg (21) opposite to the first hook leg (19) and interconnected with the first hook leg (19), which said second hook leg (21) has a thickness $D_E$, whereby thickness $D_E$ is less than thickness $D_A$.

7 Claims, 3 Drawing Sheets

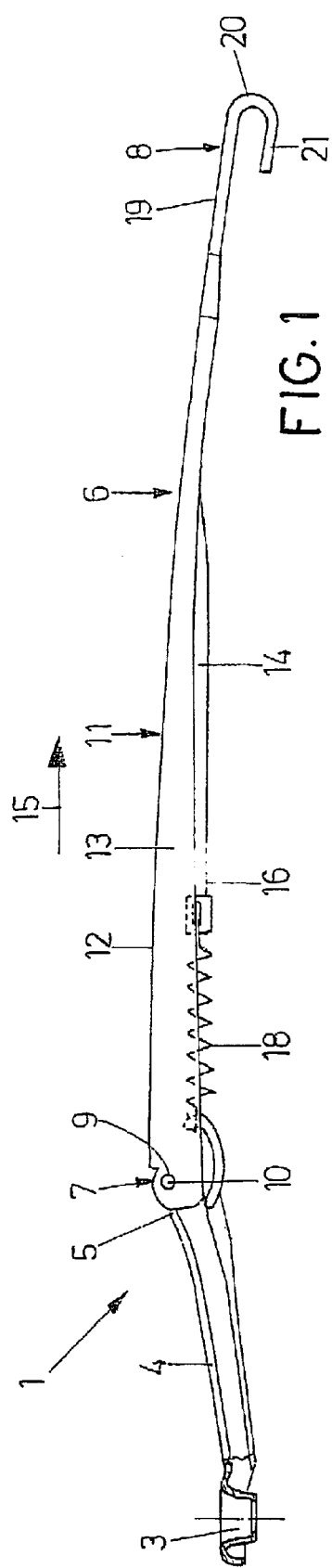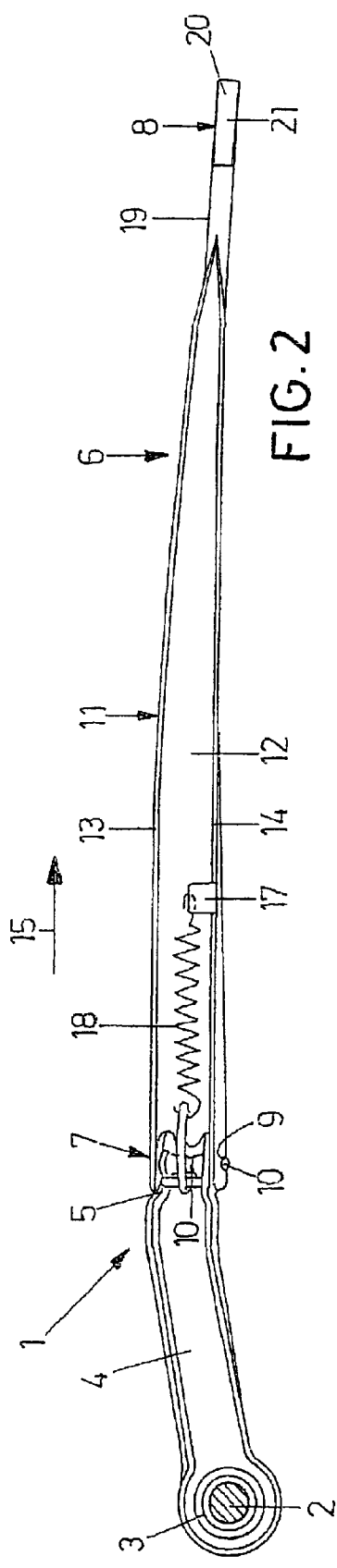

WIPER ARM FOR AUTOMOBILES

BACKGROUND OF THE INVENTION

The invention concerns a wiper arm for motor vehicles.

It was made known in DE 197 35 301 A1 to form the wiper bar for windshield wipers as a single component out of sheet metal. On its exposed end, the wiper bar has a U-shaped, connecting hook that is composed of sheet metal folded in two or three plies across its entire length. As a result of this, the connecting hook has a non-negligible overall height that is an influential factor in the aerodynamic drag of the entire windshield wiper. Moreover, the wiper arm is located relatively far away from the window to be wiped.

SUMMARY OF THE INVENTION

The invention is based on the object of further developing a wiper arm of the previously-known type in such a fashion that the overall height is reduced while the loadability remains the same.

The core of the invention lies in developing the connecting hook comprising a first and a second hook leg in such a fashion that the hook leg closest to the window to be wiped has a thickness that is less than that of the hook leg furthest away from the window.

The advantage of a further embodiment of the present invention lies in the fact that the hook leg furthest away from the window is approximately twice as thick as the hook leg closest to the window, so that a simple production process is possible.

According to a further embodiment, the wiper bar is developed integral with the connecting hook. The advantage of this is the aesthetically uniform appearance of the wiper arm and the simpler production.

According to another embodiment, the first and second hook legs extend substantially parallel to each other. The advantage of this is that a connecting element for fastening the wiper blade can be inserted easily into the hook.

The wiper bar can be produced out of a single piece of sheet metal. The advantage of this is that a uniform aesthetic overall appearance results.

The first hook leg is formed out of dual-ply sheet metal, and the second hook leg is formed out of single-ply sheet metal. In this fashion, it is particularly easy to reduce the thickness of the second hook leg.

BRIEF DESCRIPTION OF THE DRAWINGS

Further advantageous embodiments of the invention result from the description of an exemplary embodiment with reference to the drawings.

FIG. 1 is a side view of a wiper arm,

FIG. 2 is a view of the wiper arm according to FIG. 1 from below,

DETAILED DESCRIPTION OF THE PREFERRED EMBODIMENTS

Figure 3:
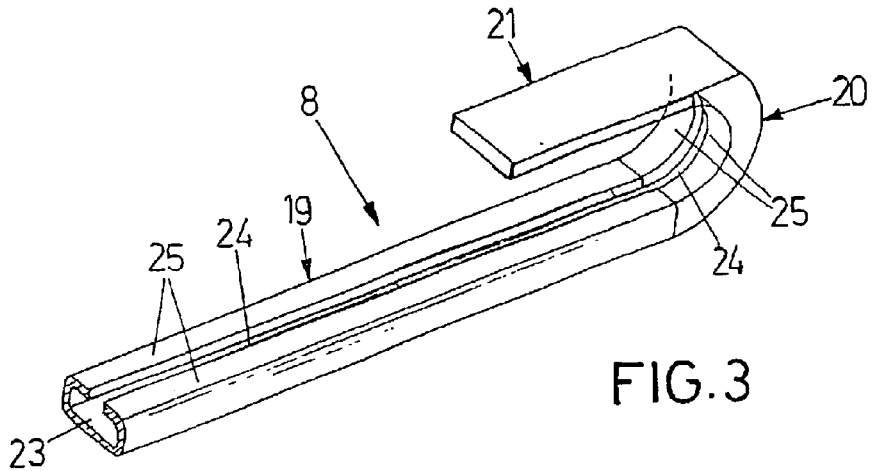
FIG. 3 is an oblique view of a connecting hook from below.

A wiper arm 1 for the windshield wiper system on a motor vehicle has a mounting arm 4 interconnected via a seating bushing 3 with a drive shaft 2 located on the motor vehicle. A wiper bar 6 is hinge-mounted via a hinge 7 on the end of the mounting arm 4 nearest to the seating bushing 3. In the region of its exposed end, the wiper bar 6 has a connecting hook 8 that is capable of being detachably connected to a wiper blade.

The commercially available mounting arm 4 has a U-shaped profile and is formed out of sheet metal. Bearing bores 9 aligned with each other are provided on the end 5 of the mounting arm 4 and on the end of the wiper bar 6 closest to the mounting arm 4, in which said bearing bores a pivot pin 10 is housed and around which the wiper bar 6 is capable of being swiveled relative to the mounting arm 4.

The wiper bar 6 has a bracket 11—extending from the hinge 7 toward the exposed end of the wiper bar 6—and the connecting hook 8 abutting said bracket and developed integral with said bracket. The bracket 11 has a U-shaped cross section having a bracket base 12 and bracket sides 13, 14 laterally abutting said bracket base. The height of the sides 13, 14 decreases along the longitudinal direction 15 of the wiper bar 6. One of the bearing bores 9 is provided in each of the walls 13 and/or 14. A securing bar 17 extending parallel to the base 12 and projecting in the direction toward the wall 13 is provided on the bottom edge 16 of the wall 14, which said securing bar is developed integral with the wall 14. A tension spring 18 for applying force to the wiper bar 6 in the direction of a window to be wiped is provided between said securing bar and the pivot pin 10.

In the view according to claim 1, the connecting hook 8 has a U-shaped cross section. It is formed by a top hook leg 19 developed integral with the bracket 11, a curved hook base 20 developed integral with said hook leg, and a bottom book bar 21 extending parallel to the top hook leg 19 and developed integral with the hook base 20. The top hook leg 19 has a thickness $D_A$. The bottom hook leg 21 has a thickness $D_E$. With regard for the relationship between the thicknesses, the following applies: $1.5 \leq D_A/D_E \leq 2.5$ and, in the case of the present exemplary embodiment in particular: $D_A/D_E \approx 2$. In absolute numbers, the following applies: $D_A \approx 4$ mm and $D_E \approx 2$ mm.

The hook leg 19 and large parts of the hook base 20 up to a transition 22 have an outer leg 23 and two inner legs 25 folded up on said outer leg from both longitudinal sides, extending parallel to said outer leg, and separated in the center by a longitudinal groove 24. The legs 25 terminate in the region of the transition 22. Only the outer leg 23 extends further and forms the bottom hook leg 21 on the other side of the transition 22. On the end of the connecting hook 8 located opposite to the longitudinal direction 15, the inner legs 25 transition continuously into the walls 13 and 14, and the outer leg transitions continuously into the base 12. The hook base 20 has a substantially uniform curvature in terms of the bend axis 27.

Figure 4:
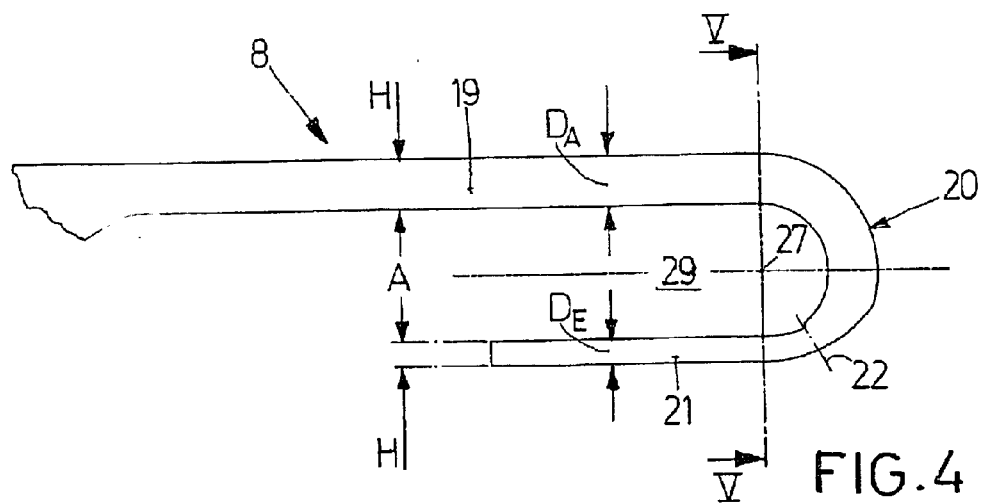
FIG. 4 is a side view of the connecting hook according to FIG. 3.
Figure 5:
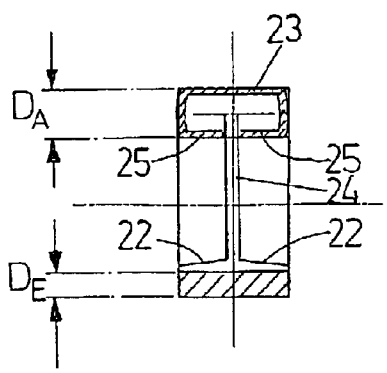
FIG. 5 is a cross-sectional illustration along the line of cut V—V in FIG. 4.
Figure 6:
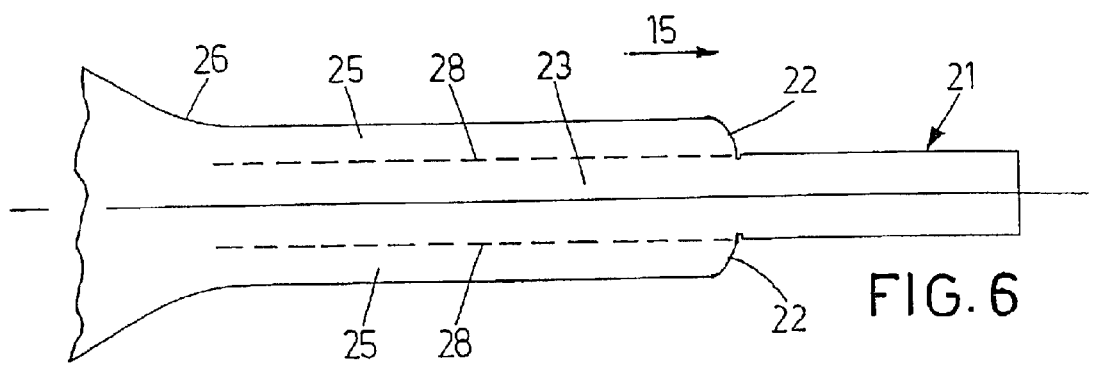
FIG. 6 is a sheet-metal cut for the connecting hook according to FIG. 3.
Figure 7:
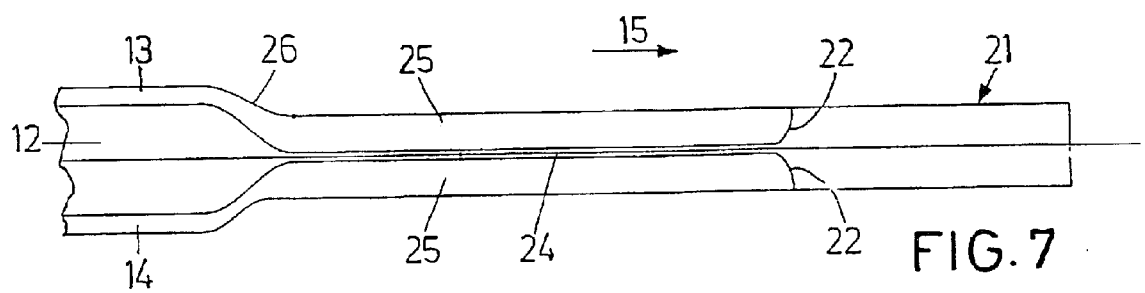
FIG. 7 is the sheet-metal cut according to FIG. 6 in partially folded form.
Figure 8:
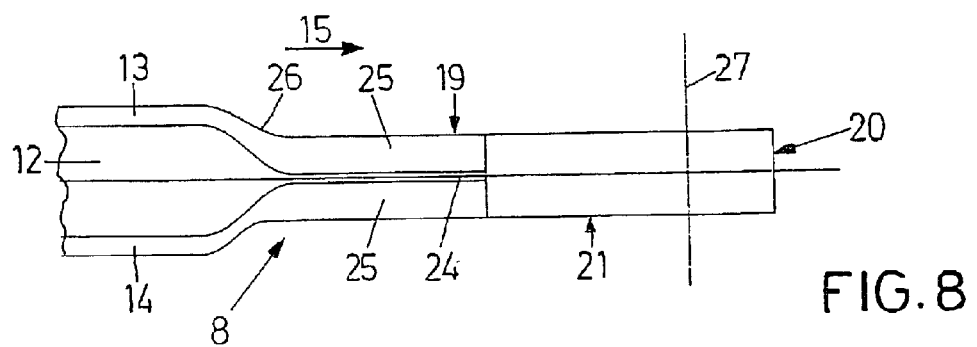
FIG. 8 is a top view from below of the connecting hook according to FIG. 3.

Production of the wiper bar 6 starts with a single-component sheet-metal cut, the anterior end of which is shown in FIG. 6. The inner legs 25 are interconnected via folding lines 28 with the outer leg 23. In an initial folding procedure, the inner legs 25 are folded up on the outer leg 23, forming a longitudinal groove 24. Simultaneously, the walls 13 are bent 90° relative to the base 12, so that the intermediate product shown in FIG. 7 results. Finally, the bottom hook leg 21 and a part of the dual-ply arrangement comprising inner legs 25 and outer leg 23 are bent around the bend axis 27, so that the connecting hook 8 shown in FIGS. 2, 4 and 8 results.

An advantage of the production of the wiper bar 6 out of a sheet-metal panel formed as a single component lies in the fact that a closed aesthetic overall appearance results. The embodiment of the connecting hook 8 having a top hook leg 19 and a bottom hook leg 21 that is half as thick has the advantage that the overall height H of the connecting hook 8 can be reduced while the height A of the hook opening 29 remains the same. The shear forces occurring during the wiping procedure can be absorbed by the top hook leg 19 and the hook base 20. The bottom hook leg 21—which serves only to fix the wiper blade in the direction of the window to be wiped—need only absorb forces that are much smaller, as compared to the top hook leg 19, so that the embodiment of the hook leg 21 that is half as thick as the top hook leg 19 is sufficient. By reducing the height H, the wiper bar 6 is located closer to the window to be wiped, so that the wind resistance that occurs—which is important mainly as high driving speeds—is reduced. Moreover, the wiper arm 1 is less noticeable, since it lies closer to the window.

What is claimed is:

1. A wiper arm for motor vehicles, comprising:

a driveable mounting arm (4) for connection to a motor vehicle, and a wiper bar (6) hinge-mounted on the mounting arm (4), wherein said wiper bar has a connecting hook (8) for attaching a wiper blade, wherein the connecting hook (8)

has a first hook leg (19) having a thickness $D_A$, and being formed by a sheet-metal panel folded in two plies, has a second hook leg (21) opposite to the first hook leg (19) and interconnected with the first hook leg (19), which said second hook leg (21) has a thickness $D_E$ and is formed by a single-ply sheet-metal panel, and has a hook base (20) that is developed integral with the first hook leg (19) and loins the first hook leg (19) and the second hook leg (21), the second hook leg (21) being developed integral with the hook base (20), iii) whereby thickness $D_E$ is less than thickness $D_A$.

2. The wiper arm according to claim 1, wherein the relationship between thickness $D_A$ and thickness $D_E$ is $1.5 \leq D_A/D_E \leq 2.5$ and, in particular, $D_A/D_E = 1$.

3. The wiper arm according to claim 1, wherein the wiper bar (6) is developed integral with the connecting hook (8).

4. The wiper arm according to claim 1, wherein the first hook leg (19) extends substantially parallel to the second hook leg (21).

5. The wiper arm according to claim 1, wherein the wiper bar (6) is formed out of sheet metal.

6. The wiper arm according to claim 5, wherein the wiper bar (6) is formed out of a single-component sheet-metal panel.

7. The wiper arm according to claim 1, wherein the hook base (20) has a substantially constant curvature with regard for a bend axis (27).

* * * * *